United States Patent [19]

Fisher

[11] 4,356,357

[45] Oct. 26, 1982

[54] SELECTOR AND DIRECTIONAL ACTUATOR FOR ELECTRICAL REMOTE CONTROL REARVIEW MIRRORS

[75] Inventor: Robert J. Fisher, Livonia, Mich.

[73] Assignee: Harman International Industries, Inc., Grandville, Mich.

[21] Appl. No.: 169,189

[22] Filed: Jul. 15, 1980

[51] Int. Cl.³ .................. H01H 9/00; H01H 19/00; H01H 25/00
[52] U.S. Cl. .................. 200/5 R; 200/1 V; 200/6 A; 200/17 R
[58] Field of Search ............... 200/4, 5 R, 6 A, 17 R, 200/18, 1 V, 153 K; 318/287, 293

[56] References Cited

U.S. PATENT DOCUMENTS

| 2,768,366 | 10/1956 | Bertaud | 200/6 A X |
| 3,293,381 | 12/1966 | Eitel | 200/6 A |
| 4,245,137 | 1/1981 | Hirai et al. | 200/6 A X |
| 4,315,113 | 2/1982 | Fisher et al. | 200/5 R |

Primary Examiner—J. R. Scott
Attorney, Agent, or Firm—Miller, Morriss and Pappas

[57] ABSTRACT

A combination selector and directional switch for electrically operated remote control rearview mirrors in which a single control fixture allows the operator to select a right or left hand mirror and then by manipulation of a pendant, movable in two plane directions, to orient the mirror glass as desired. The linear movement of a selector lever causes rotational movement of a selector ring whereby the left or right hand mirror is connected to be controlled by the selected manipulation of the pendant.

5 Claims, 9 Drawing Figures

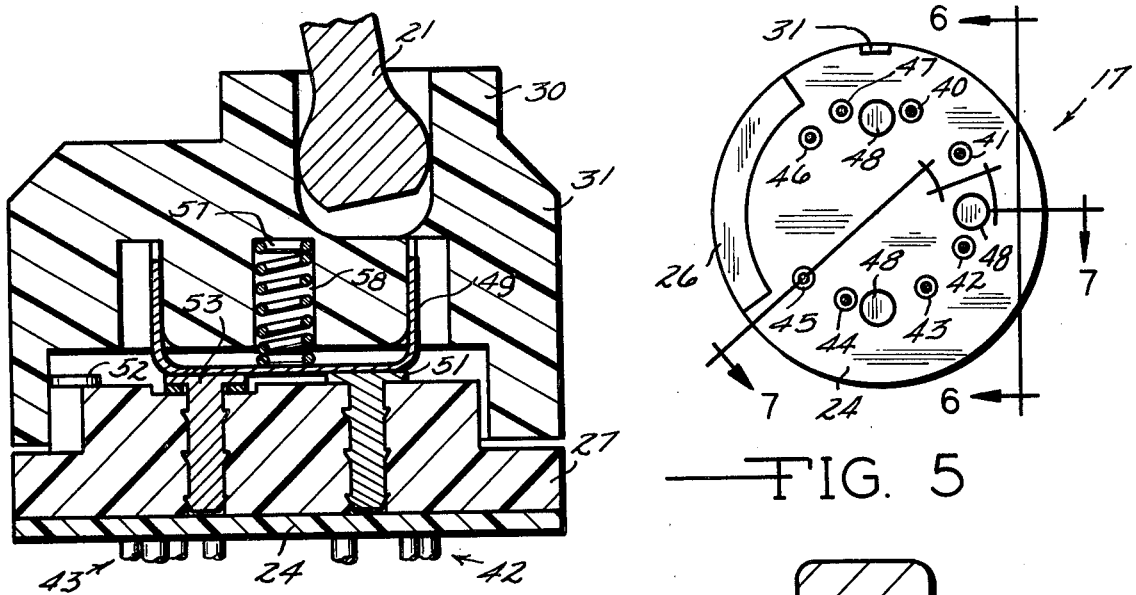
FIG. 5
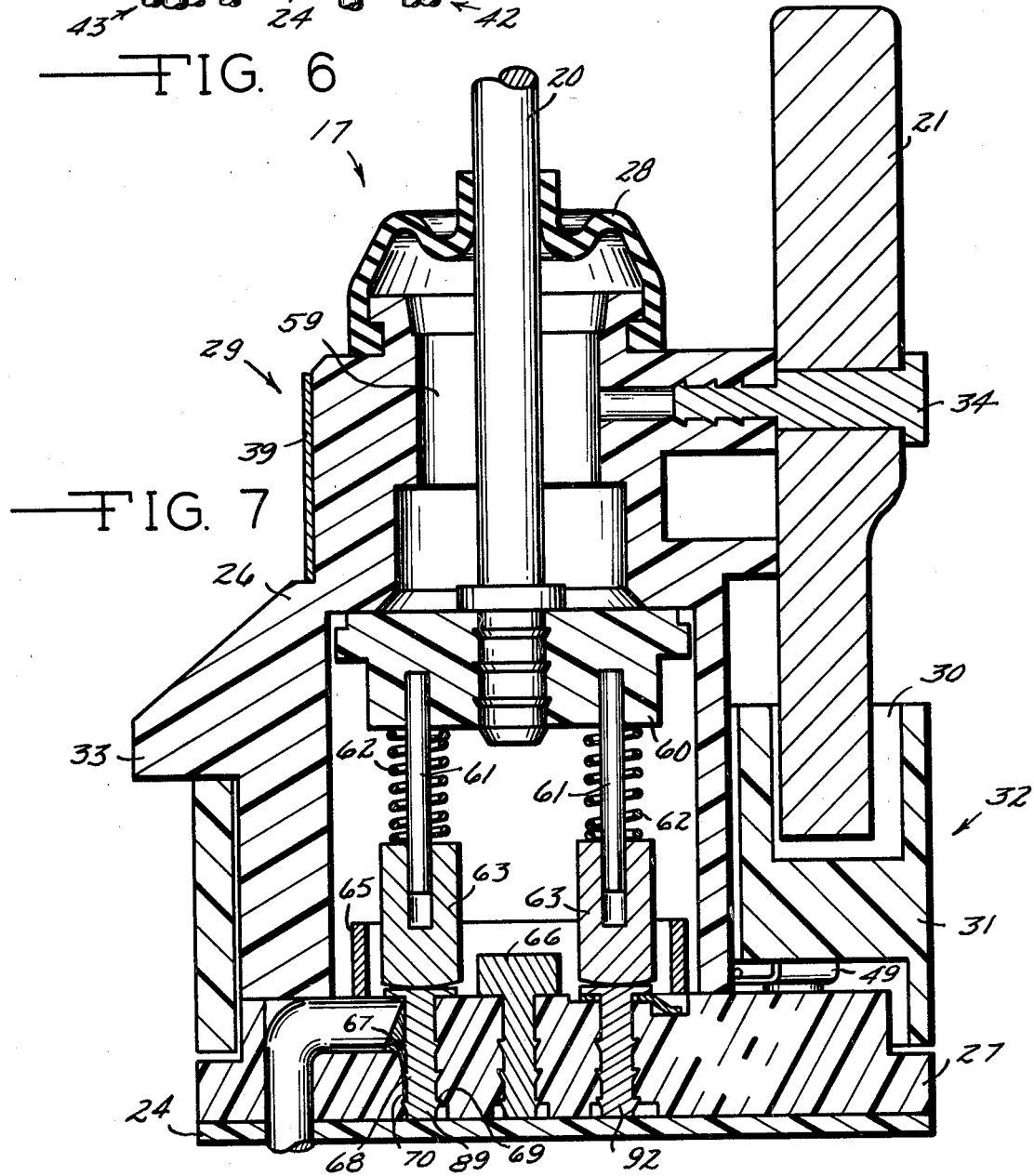
FIG. 6
FIG. 7

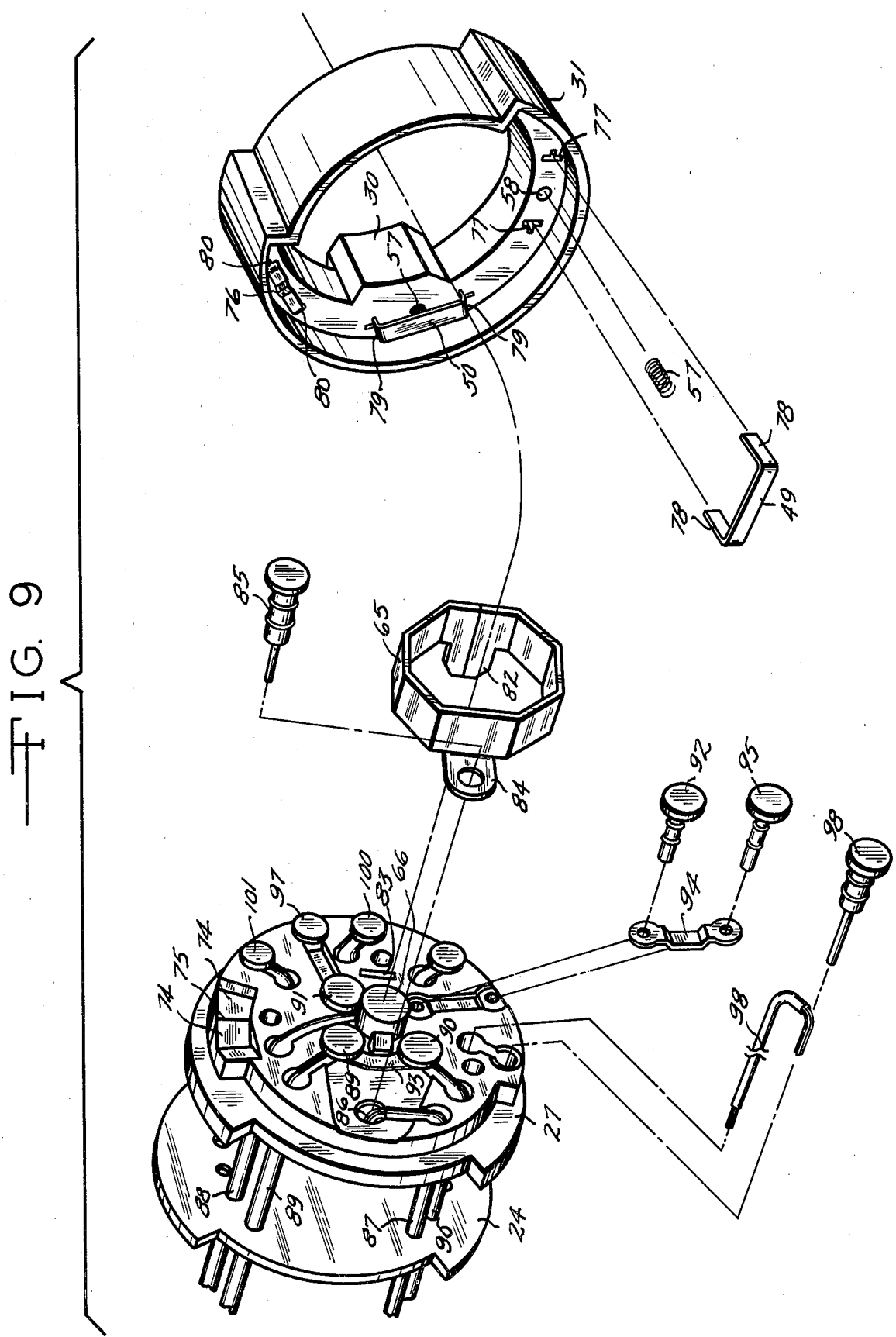

SELECTOR AND DIRECTIONAL ACTUATOR FOR ELECTRICAL REMOTE CONTROL REARVIEW MIRRORS

BACKGROUND OF THE INVENTION

The present invention is related to electrically operated remote control rearview mirrors and more particularly to a single control fixture containing a combined mirror selector and a mirror directional orienting control. This permits a single actuator unit or fixture to control plural mirror units as selected by the operator. This is achieved in such a manner as to be logical to the operator so that a selector lever detentably is movable to connect with a selected mirror whereupon the operating pendant or lever is then able to perform the adjustment function of the mirror or mirror glass by moving in one plane (horizontal) for left and right shifts and by moving in a second plane (vertical) for up and down shifts of whichever mirror is selected. Upon release of the directional control, up-down, left-right lever or pendant, the pendant centers and power to the directional mirror drives is shut off.

By means of this device, the one control fixture-actuator does the job formerly requiring two actuators and the simplicity of achieving the selector function while using a familiar basic directional fixture resembling prior art mechanical actuators results in substantial overall savings of cost, weight and installation expense over the prior practice of requiring one control actuator for each mirror.

The U.S. Pat. No. 3,459,470 to O. Hahn for a Remotely Adjustable Motor Driven Rearview Mirror exemplifies the general type of electrically powered mirror structures served by the present invention.

The closest prior art known to applicant is the art of the U.S. Application Ser. No. 113,261 filed on Jan. 18, 1980 now U.S. Pat. No. 4,315,113 and directed to a directional actuator for electric powered remote control rearview mirrors and which is modified, as will be seen, in very simplistic ways to achieve the desired and unobvious combination set out herein.

In the preparation of the present application, a Japanese structure has come to hand which is structurally and functionally different than the structure of the inventor herein but which allows selection and control at a common knob or lever. The device seen appears to be less compact, exposes circuitry, and little is known of its origin, use or application. No patents directed to the structures of the Japanese device have been encountered by the inventor. In Europe there are reported to be electrical control devices different in structure and function from the presently disclosed devices for electrical rearview mirrors.

Other relevant switch art which is not necessarily suggestive of being applicable to the problems of electric remote control of rearview mirrors is:

U.S. Pat. No. 3,927,285 to Louis H. Frost and Walter H. Powers and directed to a Multidirectional Switch with Universally Pivot Actuator for Activating Plural Circuits. This switch lacks requisite compactness and ruggedness required by a combination selector and directional control device for mirrors. In function, it deviates from the function of the present invention and the functions make it unsuited for directional control and selection of particular rearview mirrors.

U.S. Pat. No. 3,784,746 to Richard L. Hess is for a Single Actuator for Effecting Multiple Controls. This is unsatisfactory for adaptation and not amenable to the control of electrically powered remote rearview mirrors.

U.S. Pat. No. 3,483,337 to Theodore H. Johnstone and Barthold F. Meyer for a Six-Way Rotary Inclined Plane Centering Switch expresses a selection structure which is unsatisfactory for the needs of the present invention.

U.S. Pat. No. 3,419,684 to John M. Lord and Glenn E. Sterly shows a sequentially switching structure unlike the presently described device and unsuited to the integrated selection and direction control of an electrical remote control rearview mirror.

The U.S. Pat. Nos. 3,222,584 to Gideon A. DuRocher, 3,467,801 to Benjamin H. Matthews, and 3,688,062 to M. Yamamoto and Y. Shintomi are reversing switches for shifting polarity but are unrelated to and do not suggest adaptation in an actuator fixture for integrated control of direction and selection of electrical remote control rearview mirrors.

Heretofore it was believed that a directional control actuator was required for each mirror and it was usual to see two controls or actuators in the vehicle and both accessible to the operator. Usually the actuator most near the left side of the vehicle controlled the rearview mirror on the left side of the vehicle and the actuator most near the right side was connected to the right hand rearview mirror. This followed generally the lead of mechanically operated remote controls and in using electrically operated mirrors, leads ran from each actuator control to the two motors found in each mirror housing and the leads drivably connect to the mirror drivers within the housing. One motor tilts or moves the mirror up or down and the other motor turns the mirror to left and right as selected by the operator. Using both directions, a wide variety of incremental adjustments can be made within the travel limits of the system or housing. In the electrical controls, therefore, the movement of the actuator lever upwards causes upward movement by the motor. Downward movement of the same lever results in reversal of polarity and consequent reversal of the same motor in tilting the mirror downwardly. The selection of directions of lever movement and mirror is tied to operator logic. "Up" turns the mirror up, and "Down" turns the mirror down.

Similarily (and in the same vein of logic), a left movement of the directional actuator lever causes corresponding motion in the mirror turning to the left and a right movement of the actuator lever causes the mirror to pivot to the right with a reversal of polarity of current to the motor. This reversal was achieved by means of the actuator and was relayed to the motors in the mirror housing. Duplicate actuators were required and this meant expense and separate mounting and installation. It was believed desirable if a single actuator fixture could be made to selectively serve one or the other mirror and then the control actuator would be able to achieve directional orientation. The same directional control would activate the selected mirror. While sounding simple, proposals to achieve such combination function in any integrated manner were too complex to be seriously taken as practical or economic options.

The stark simplicity of the directional control switch structure of U.S. Pat. No. 4,315,113 provided a most adequate, inexpensive, durable and simply installed solution to directional control but seemed impossible of combining with a selector without very involved electrical circuitry or switching means. The present structure marries and integrates directional control of the general type of U.S. Pat. No. 4,315,113 with selective circuitry in a compact, simple, and easily understood and manipulated structure acceptable to the logic applied by most vehicle operators. The integrated combination actuator selector of the present invention fully encapsulates the electrical leads and conceals all electrical contacts from exposure.

Accordingly, a principal object is to provide a combination fixture capable of mirror selection (as between, say, left and right hand remote control rearview mirrors) and, upon selection, to allow mirror control and adjustment.

Another object is to achieve such a single fixture by simple means and in a structure having compactness and amenability to service, replacement and integration in an automobile wiring harness.

Another object is in achieving the above integrity in a rugged service device, easy to install, to replace, and to position variably in an automobile interior as dictated by automotive design. Finally, the operator welcomes the structure because one hand moving to one position can adjust both mirrors.

Other objects, including a structure amenable to operator-logic and economy, will be also appreciated as the description proceeds.

BRIEF DESCRIPTION OF THE DRAWINGS

FIG. 5 is a bottom plan view of the structure of the present invention and indicating the bottom plate covering of components in prevention of tampering or shorting the circuitry, as will be seen, since the leads move out of the base plate in sheathed form and run to the connector seen in the FIG. 3 for integration with a control wire harness.

FIG. 6 is a fragmental section view taken on the line 6—6 of FIG. 5 and indicating the selector lever pocketed in the selector ring and indicating the spring loaded moving bridging contacts in the selector ring to accomplish optional contact with selected fixed contact posts in the actuator control fixture.

FIG. 7 is a full cross section side elevation view taken on the line 7—7 through the actuator fixture of the present invention and indicating the neutral positioning of the directional control element on the axis of the body and illustrating the concentric movable selector ring in respect thereto and journalled on the body and in selection of circuits to one or the other of plural mirror structures.

FIG. 9 is an exploded perspective view of the circuit plate of the present invention in relation to the rotatable selector ring and sliding contacts therein and best indicating the compactness and simplicity of wiring and showing the selector detent means and inner and outer headed pin-contacts in the circuit plate.

GENERAL DESCRIPTION

Figure 1:
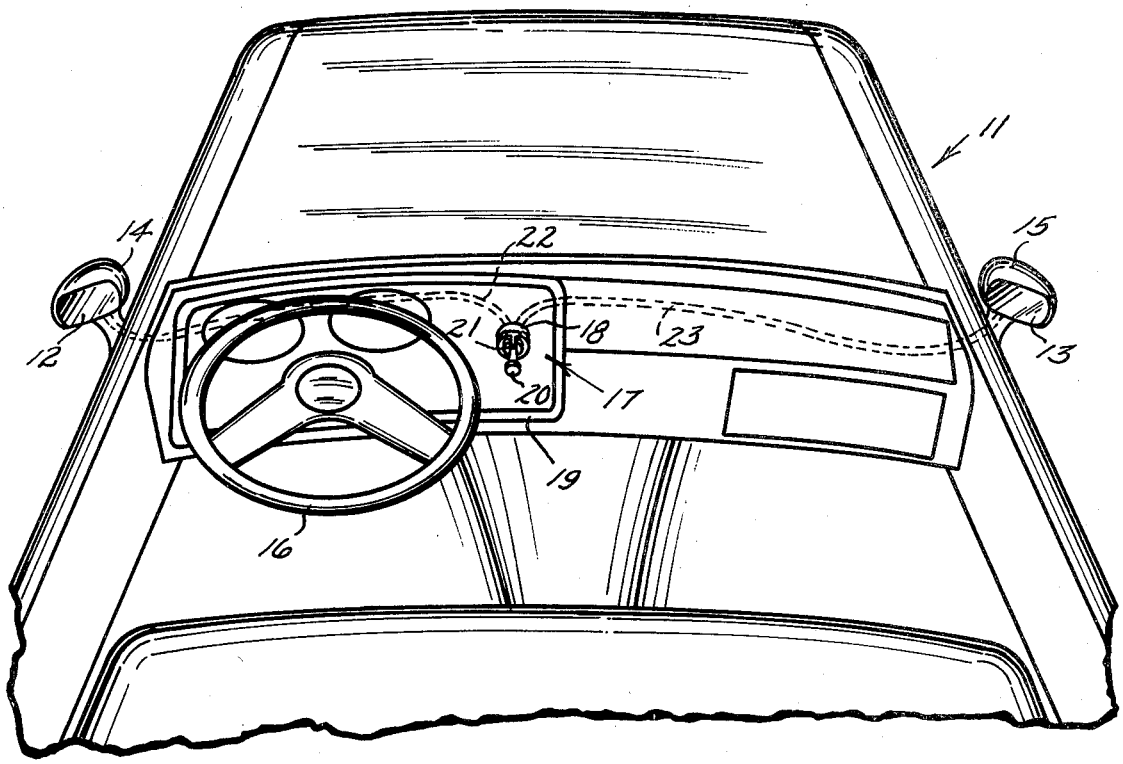
FIG. 1 is a somewhat schematic perspective partial view of an automobile as seen from directly behind the driver seat and looking forwardly so that on the dash or interior trim an actuator fixture is indicated in accord with the present invention having electrical leads (phantom lines) running from the single actuator to the left hand and right hand mirrors projecting outside of the vehicle.

In general, the present invention is a selector-actuator combination for rearview electric powered mirrors in which a single actuator fixture accommodates a mirror directional control section with circuitry adapted to be activated by movement of a neutral biased actuator in up-down or left-right directions; a selector section shiftable to select between left and right hand mirrors for actuation by the control section and including electrical circuitry in said sections and connected to the left and right hand mirrors by suitable sheathed leads for selective energization by the control section and in accord with selected manipulation of the selector section of the actuator combination.

The actuator fixture includes a first generally cylindrical body with a pendant or handle axially extending from one end of the body and restricted in movement to two extreme positions in two planes at right angles to each other. The handle is normally bias-positioned on the body axis and centered. The body also provides a pivotal external connection for a selector lever. Internally, the handle or pendant holds a four wiper tip cluster, the wipers functioning in pairs which are movable upon selected limited movement of the handle. Such movement in each extreme of travel causes selected wiping contact by certain of the wiper tip contact cluster elements with a central contactor and a selected one in a pair of the spaced-apart contactor pins and the other and opposite of the pair of contactors is in wiping contact with an oppositely positioned contactor pin and a confining ring. On reversal of the direction of movement, the cluster reverses direction and the same type of contact is made but in an opposite sense. This reverses polarity since the central contactor is connected to power (DC) and the ring contactor is connected to a ground. The input of power may be reversed as desired if there is advantage to grounding the center contact and powering the ring contactor. Such an array is generally set out in U.S. Pat. No. 4,315,113. When movement of the handle is in a plane at right angles to the first described plane, the same type of function takes place. In one plane (vertical), the up-down motor is reversibly driven. In the other plane (horizontal), the left-right motor is reversibly driven. The circuit with contactor pins to achieve the directional control is provided on a circuit block or plate coaxially aligned and connected to the actuator body and forming a transverse end barrier at the lower end of the body. The contactors are driven into the block or circuit plate and provide intimate electrical connection with appropriate leads. A selector ring encircles the body and is restricted in its rotational movement by engagement with stop barriers comprising portions of the body. The selector ring is impinged upon by the lever so that as the lever is selectively moved one way or the other, opposite corresponding motion is imparted to the selector ring. The lever translates lineal movement to limited rotational movement of the ring. Two elongate spring loaded contact elements are provided in the selector ring and a spring detent is also provided so that upon either extreme of selected rotation there is a bias to remain in the selected detent position since the spring element seeks one of two extreme positions defined in the perimeter of the circuit block or plate. This also results in the wiping of the spring loaded contacts into one extreme position against selected perimeter contacts. Thus, the circuit block is fixed in its relation to the body and the selector ring is rotationally movable on the body as a journal by manipulation of the lever. Unlike the precise circuitry in the U.S. Pat. No. 4,315,113, the present circuit plate is modified by bridging elements so that as the selector ring contacts are rotated adjacent the perimeter of the ring, the contactors select access of power to one or the other of the mirrors. Such selection is physically achieved by the rotation of the ring. Having selected the mirror to be directionally controlled, the operator operates the pendant handle and the directional control is substantially as achieved in the selected mirror as set out in the U.S. Pat. No. 4,315,113.

The circuit, established on the circuit plate by positioning of contact pins, central contactor, contactor ring and the selector ring, spring loaded contacts and with the direction control via the pendant available in either extreme position, is lead out of the body covered by a cover plate and in the sheathed or insulated leads run to the desired positions in a connector. Via the connector, power and ground is established and six branch leads run three to one mirror and three to the other thereby allowing one lead to each motor per mirror and a common lead return allowing for reversal of both motors in both mirrors, one at a time for each function.

The result is a simple solution to a rather complex problem and in an extremely inexpensive manner with savings of one actuator and achieving vastly simplified installation in automatic usage where space is limited and reduction in weight and manual effort is desirable and the fasteners and contacts utilize the press flow engagement as expressed in the U.S. Pat. No. 4,315,113.

SPECIFIC DESCRIPTION

By reference to the drawings, the preferred embodiment of the present invention is operably shown and by first reference to the FIG. 1 thereof, the use setting of the present invention is best appreciated with its installation in an automobile interior. In FIG. 1, the automobile 11 is shown equipped with a left hand rearview mirror 12 which is electrically operated and a right hand rearview mirror 13 which is also electrically powered. The mirrors 12 and 13 are in styled housings 14 and 15, respectively, which housings 14 and 15 are connected to and extend from the automobile 11 so as to be visible to an operator sitting behind the steering wheel 16. Selectively located, where it is easily accessible to the driver or operator, is the combination selector-control actuator fixture 17 of the present invention. The single actuator fixture 17 controls both mirrors 12 and 13. This is shown in a typical dashboard installation ringed by an escutcheon or trim plate 18 on instrument panel 19. A pendant 20 used for directional control projects axially from the fixture 17 and a lever 21 used for selection as between the mirrors 12 and 13 is pivotally mounted on the fixture 17 and shown in an intermediate (no selection) position. Electrical leads 22 and 23 are shown in phantom line extending from the fixture 17 to the respective mirrors 12 and 13. As will be later appreciated, the leads 22 and 23 provide the electrical connection to motors which are drivably connected to each of the mirrors 12 and 13 and the motors are concealed by the respective housings 14 and 15. The lever 21 selects which mirror is to be activated and manipulation of the pendant 20 achieves the directional manipulation of the mirrors 12 and 13 remotely positioned outside the vehicle 11 and the selection and manipulation logic is natural to the operator.

Figure 2:
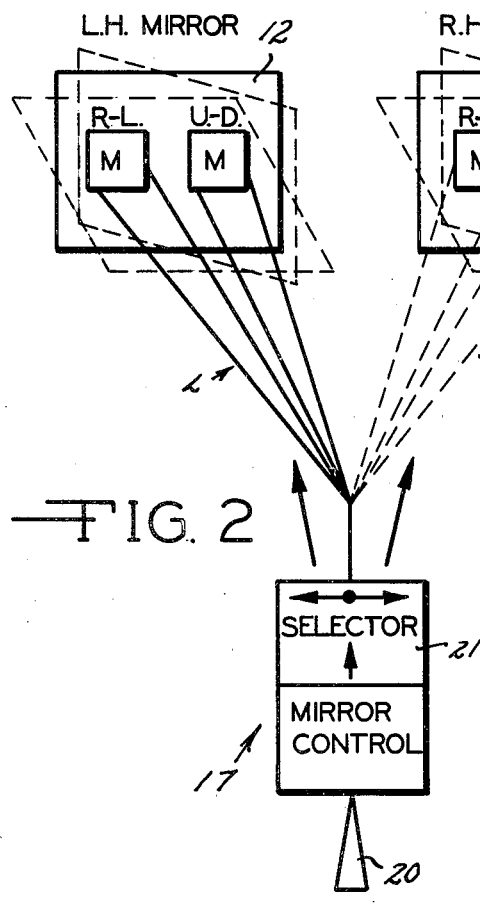
FIG. 2 is a schematic block diagram functionally indicating the combination of mirror selector and mirror control in a single fixture and indicating that the actuator fixture can be used to select one or the other of the mirrors and then control the movement of the motors at the mirror selected and the motors in each mirror case or housing are reversible (reversing polarity) in accord with selections at the combination actuator and selector.

FIG. 2 assists in visualizing function of the actuator fixture 17 in selected control over the mirrors 12 and 13. Two motors M are connected to each mirror 12 and 13. One motor M (R-L) turns the mirror 12 or 13 to left and right and the other motor M (U-D) pivots the mirror 12 or 13 up and down. This is electrically achieved by reversing the polarity of current serving each motor M and this function is schematically expressed by the directional control rays L (solid to the motors M in mirror 12) and R (phantom to the motors M in mirror 13) running between the actuator fixture 17 and the motors M. Which control rays to each motor M are actuated and in which direction is determined by movement of the pendant 20 in the plane to achieve the same relative movement. Thus, if the pendant 20 is moved to the left or right in the horizontal plane, then the mirror 12, for example, is turned by motor M (R-L) in the selected direction and if the pendant 20 is pivoted up or down (vertical plane), then the motor M (U-D) is selectively energized and tilts the mirror 12 in an up and down manner, as desired.

If the selector 21 is moved to allow current access to the mirror 13, then the movement of the control pendant 20 directs current only to the selected motors M connected to the mirror 13 and the movement is R-L or U-D depending upon the corresponding extreme position of the pendant 20 in the horizontal and vertical planes. When the pendant 20 is released, it self-centers as illustrated and no power can reach the control motors M. The phantom line parallelograms adjacent the mirrors 12 and 13 indicate one movement extreme in each of the adjusting vectors for each mirror 12 and 13. Thus, it will be seen that the operator or driver first selects the left or right mirror 12 or 13 by selector 21. Then by mimicking the movement sought in the mirror 12 or 13 by manipulation of the pendant 20, he directs the positioning of the selected mirror 12 or 13 by selectively energizing the motors M. As will be seen, the reversal of each motor direction occurs upon reversal of polarity arrived at incidental to movement of the pendant 20.

Figure 3:
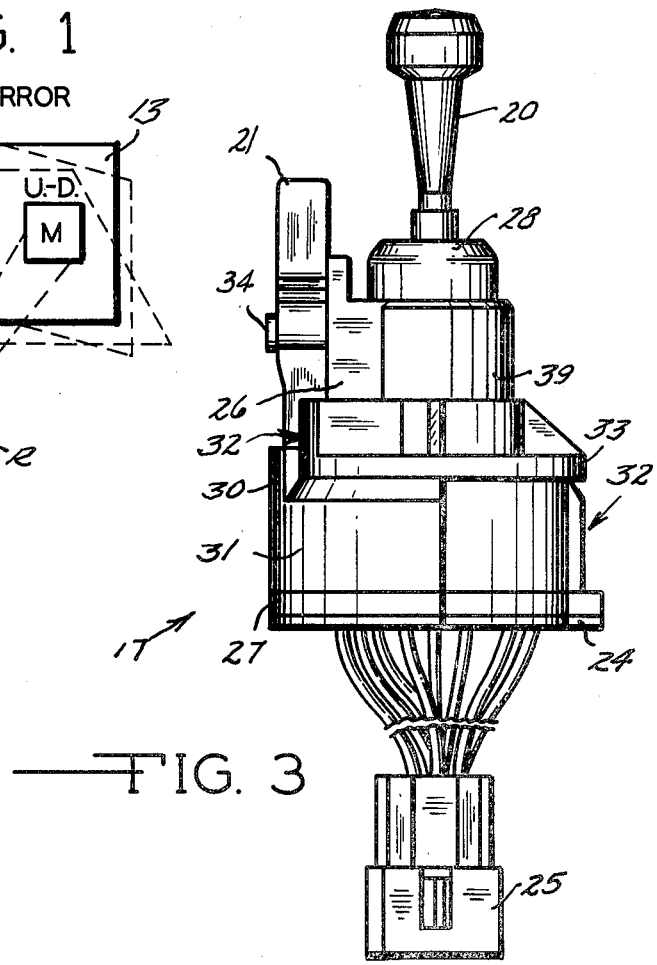
FIG. 3 is a side elevation view of an actuator fixture in accord with the present invention revealing the simplicity of the actuator and positioned to make the selector lever visible in addition to the directional control pendant. The leads neatly extend from the base of the actuator fixture and are carried to a connector for simple coupling and integration of the structure in the ignition system of a vehicle.

FIG. 3 provides a profile view of the actuator or control fixture 17 and carries the sheathed electrical leads from the cover or bottom plate 24 to connection in the plural contact receptacle connector 25. The pendant 20 enters and axially extends from the generally cylindrical body 26. The pendant 20 and body 26, together with the electrical contacts and the cooperating circuit plate 27 and dust boot 28, comprises the directional control section 29 of the actuator fixture 17. The selector lever 21 is pivotally attached to the body 26 externally of the body 26 and extends into a receiver portion 30 of the selector ring 31. A radial extension 32 from the body 26 provides rotation limiting stops against the receiver portion 30 of the selector ring 31 thereby limiting the movement extremes of the ring 31. These limits, as will be seen, correspond to two detent extreme positions as between the selector ring 31 and the circuit plate 27. The selector ring 31 with its cooperating electrical and detenting function against the circuit plate 27 is a consequence of manipulation of the lever 21. These elements generally comprise the selector section 32 of the actuator fixture 17. It will be appreciated that the ring 31 is in a running journalled fit over the lower end of the cylindrical body 26 and against the flange 33 thereof and closing against the circuit plate 27. The headed pivot pin 34 passes through the lever 21 in a journalling relation and is press fixed in the body 26. The escutcheon or trim plate 18 (FIG. 1) trims off the actuator fixture 17 allowing the operator visual and manual access to pendant 20 and lever 21. The steel split sleeve or collar 39 is fitted over the body 26 at the top of the flange 33 to provide a set screw surface for attachment of the escutcheon 18 or other fastening and in protection of the body 26.

Figure 4:
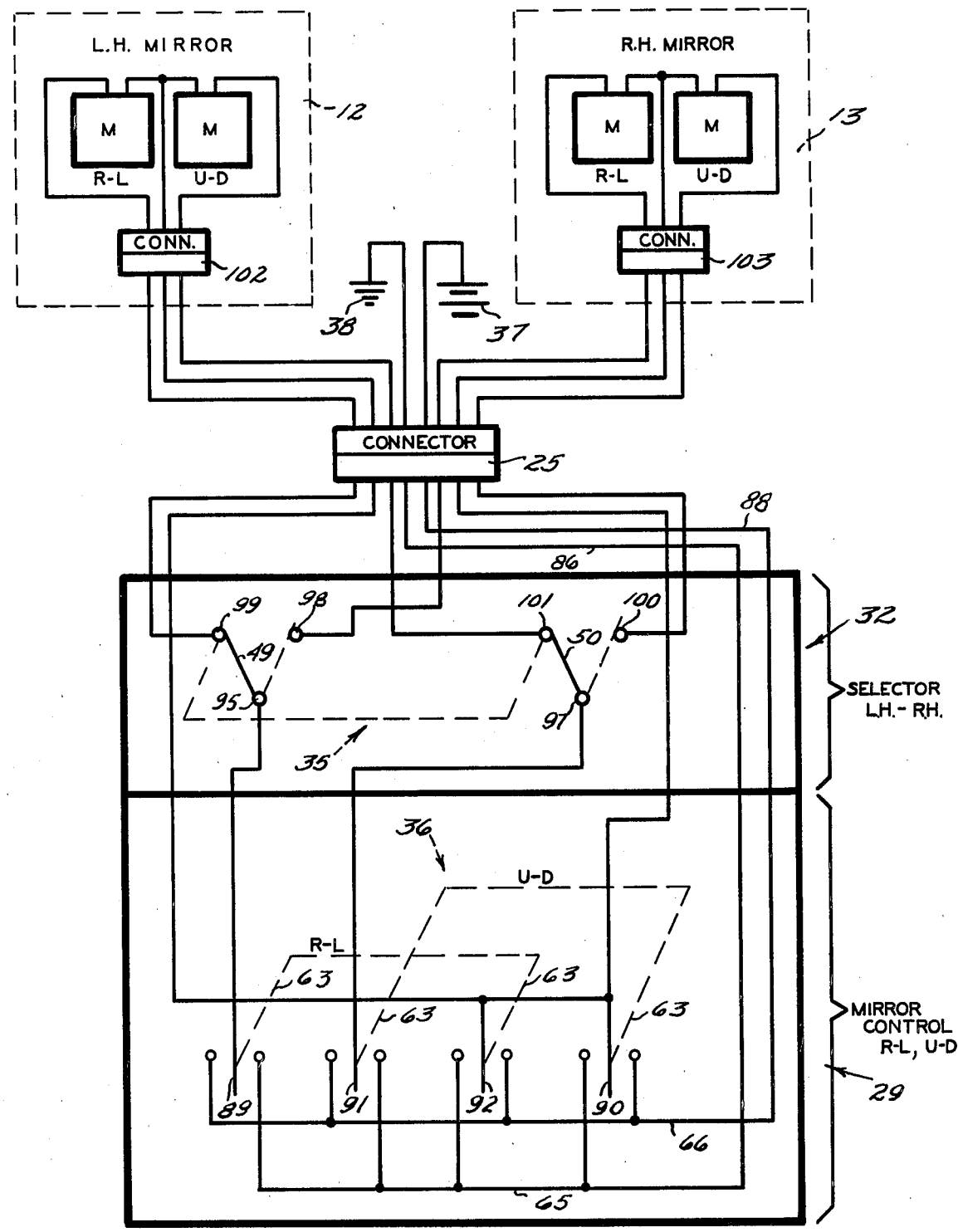
FIG. 4 is a circuit diagram which schematically shows integration of the selector and mirror control functions and using the simple, plural lead connectors illustrates the ease of construction for installation and servicing. The hidden lines or phantom lines in the selector portion and mirror control portions indicate the functional switch alternates.

The FIG. 4 seeks to express the circuit of the structure of the present invention while expressing the mechanical interrelationships. The remotely positioned mirrors 12 and 13 are indicated with their respective drive motors M. The selector section 32 is schematically and functionally indicated with consequence of the rotation of the selector ring 31 indicated by movement from the one switch position in full line to the alternate position in phantom line. The selector switch 35 is thus schematically indicated. In the full line extreme, the mirror 12 is given access to power. In the phantom line extreme, the mirror 13 is given access to power.

The directional mirror control section 29 is shown as adjacent to and coaxial with the selector section 32 and in its normal center bias the control switch 36 has two separate position extremes from the neutral bias shown in full line. As previously explained, the up-down (U-D) movement of pendant 20 acts upon the U-D designated poles acting between the extremes of the two indicated posts and the pendant 20 moves in a vertical plane. The right-left movement acts upon the R-L designated poles acting between each of the extremes of throw. The pendant 20 then moves in a horizontal plane for operation.

Power enters the system of the actuator fixture 17 at the connector 25 as from a battery 37 or other source of electrical power as available in automobiles, and is returned to ground 38. The functioning of the circuit in FIG. 4 will be better understood as the description proceeds to the mechanical interrelationship of the structural elements.

FIG. 5 is a bottom view of the actuator fixture 17 with the disc-like bottom plate 24 closing the circuit plate 27 at the base of the body 26 around the protruding leads and illustrates the insulated wire leads 40-47, inclusive, as they move to the connector 25 through and from the bottom plate 24. Plural driven headed fasteners 48 serve to hold the bottom plate 24, circuit plate 27 and body 26 in final assembled and closed relation with the selector ring 31 rotationally sandwiched between circuit plate 27 and body 26.

FIG. 6 best shows the extension of the lever 21 into the receiver portion 30 of the selector ring 31. As can be appreciated from the FIG. 6, as the lever 21 is moved, the ring 31 moves with it and two (only one visible) slider contacts 49 and 50 are placed in selected contact as between the two outboard posts 51 and 52 and the post 53 therebetween. Unseen in the FIG. 6 is slider contact 50 and its respective outboard posts 54 and 55 and the post 56 therebetween. The centermost posts 53 and 56, respectively, are in common contact with the sider contactors 49 and 50, respectively. The slider contactor spring 57 acts against the selector ring 31 in the pocket 58 and the web portion of the slider contactors 49 and 50 to press the slider contactors 49 and 50 into resilient wiping contact with the posts 51-56, as selected. The wiping slider contacts 49 and 50 thus selectively engage the perimeter group of contacts 51-56, inclusive.

In FIG. 7, the directional control pendant 20 is seen in its normal center bias relation on the axis of the body 26. As previously indicated, the pendant 20 is movable in only two planes at right angles to each other and the planes intersect on the axis of cavity 59 and body 26. At the end of the pendant 20, a guide block 60 is mounted. It is of electrically insulated material and supports two pairs of guide rods 61. A compression spring 62 encircles each rod 61 and bears on a conducting wiper tip 63 and against the block 60. The block 60 prevents rotation of the pendant 20 by engagement of the perimeter of the block 60 against the ribs 64 (FIG. 8) in body 26. The block 60 allows tilting of the pendant 20 with suitable flexure in the tips 63 to maintain wiping contact with contactors within the perimeter of the conducting ring 65, as seen, and upon shifting the tips 63 bridge between the contactors 89 and 92 and ring 65 on one side and the center post 66 and an opposite tip 63 so that conduction occurs in one direction in one movement of travel and is reversed in polarity in the other extreme of travel of the tips 63. Upon selecting the opposite plane of movement for the handle 20, the second pair of pins 63 function in the same manner using the common center post 66 and the conducting ring 65 and with the selected contactors as 90 and 91 (FIG. 9) inside the conducting ring 65. Where the contactors are connected to electrical leads, the shanks 68 of contactor pins are provided with annular upsets 67 which drive the electrical conducting leads 70 with the pins into the resin or plastic cases 27 and provide excellent electrical and anchoring contact. Such an assembly is exemplified in the lead at the lower left portion of the FIG. 7, which enters through the bottom plate 24, passes through an opening in the circuit plate 27 and then the conducting wires are driven with the headed contactor pin into the opening in a most secure fastening, as shown. The annular upsets flow the plastic so that it closes behind the upsets and grips the pin shank 68 against withdrawal and the shoulders 69 of each annulus 67 provide a firm anchor to the plastic and to the wires 70. As will be appreciated throughout the application, this type of "flow" fastening is used, as in connection of guide block 60 to the operating pendant 20 and in the center post 66 and pivot pin 34.

Figure 8:
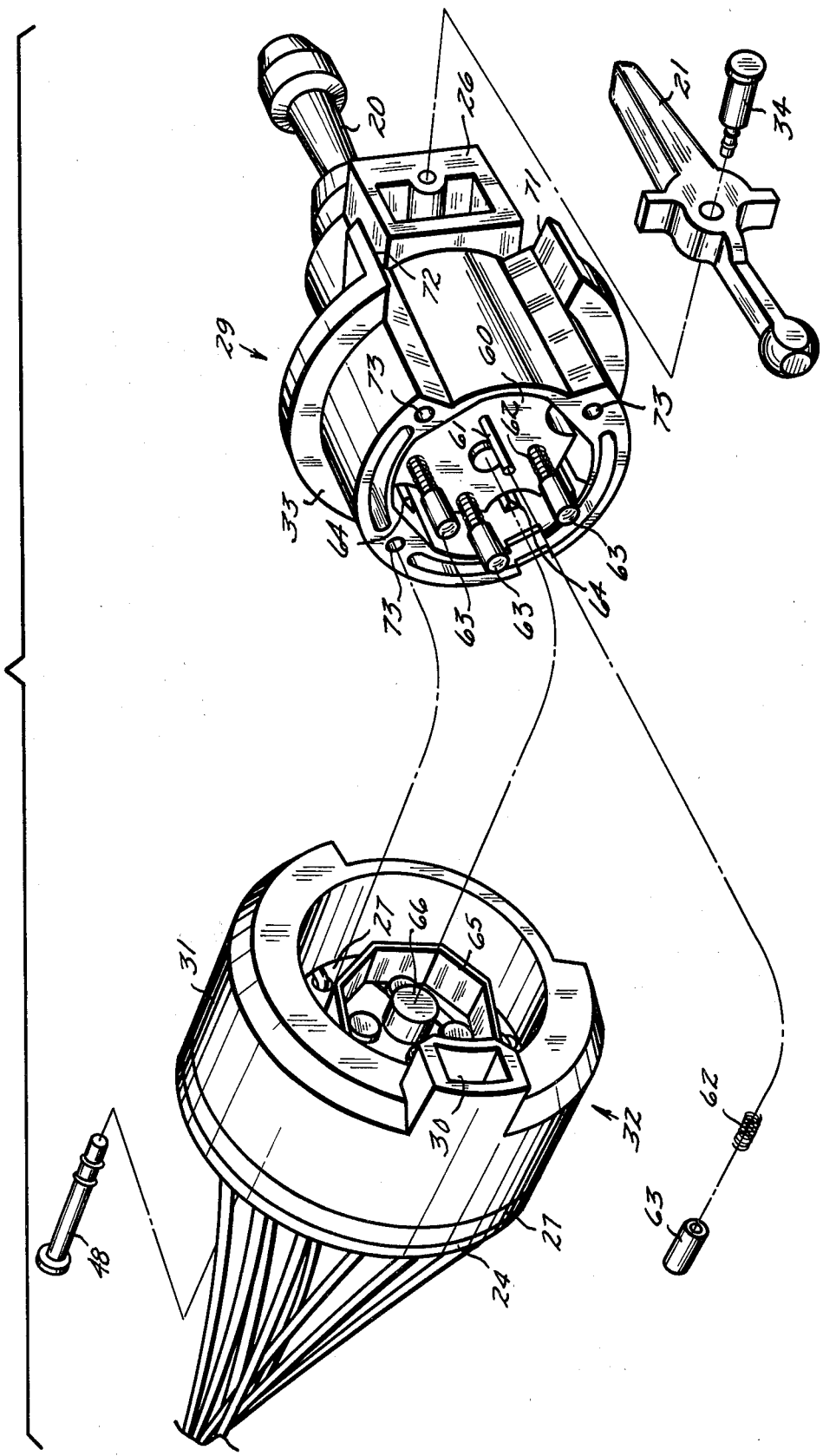
FIG. 8 is an exploded perspective view of the directional control portion of the actuator fixture and indicating its relationship to the rotatable selector ring with the selector ring limited to movement between two extreme positions as selected by the selector lever. The selector ring is positioned in contact with the circuit plate.

In FIG. 8, the buttresses 71 and 72 in the body 26 are seen to receive the portion 30 of the selector ring 31 therebetween in limiting the extremes of rotational movement of the ring 31. The headed fastener 48 (one of plural fasteners 48) are seen to pass through the bottom plate 24, circuit plate 27 and into one of the openings 73 and securing the actuator fixture 17 together. Thus, the assembly of selection section 32 to the directional control section 29 is shown and the activating lever 21 is easily attached by means of the mounting journal and pin 34 so that the lower end of the lever 21 projects operably into the receiver portion 30 of the rotation for the selector ring 31. The selector ring 31 rides and is journalled on the cylindrical extension of the body 26 upon assembly.

In the FIG. 9 the circuit plate 27 is shown related to the selector ring 31 and the octagonal form of the conducting ring 65 is appreciated. The detent ramps or depressions 74 flanking the peak or ridge 75 formed in the perimeter facing surface of the circuit plate 27 can be visualized as in cooperating function with the detent plunger 76 which is spring-loaded like the slider contactors 49 and 50 to limitedly engage one or the other ramps 74 and 75 as the ring 31 is selectively rotated. The guide slots 77 are in spaced-apart precision location to receive the legs 78 and 79, respectively, of the slider contacts 49 and 50. Similar guide slots 80 receive the legs of the U-shaped detent plunger 76 and the guide slots 77 and 80 are located on an outer perimeter of the selector ring 31 on the shoulder 81, as shown in FIG. 9. This, as will be appreciated, locates the slider contactors 49 and 50 and the detent plunger 76 outboard of the octagonal conducting ring 65 as the ring 65 is coaxially positioned on the circuit plate 27. Fixture of the conducting ring 65 to the circuit plate 27 is by means of insertion of the tabs 82 into receiver locating slot 83. The conducting ear 84 is secured to the plate 27 by the contactor pin 85 in opening 86 to the ground lead 87. The center post 66 is connected to the power lead 88.

Around the center post 66 are clustered the heads of contactor pins 89, 90, 91 and 92. These four contactor pins 89, 90, 91 and 92 are inside a spaced-apart rail formed by the octagonal conducting ring 65. A common contact is achieved between headed pins 89 and 90 by means of an arcuate conductor bridge piece 93 and to their similarly designated leads 89 and 90. A straight bridge piece 94 extends radially from the center cluster contact pin 92 and to the perimeter contactor pin 95 where it becomes the center common contact for the slider element 49. A similar radial bridge element 96 makes a common connection between contactor 91 and 97 where contactor 97 is a perimeter center contact for the slider element 50. On one side of the center perimeter contactor pin 95 is the contactor pin 98 connected to its lead bearing the same number. On the other side of the contactor pin 95 is the contactor pin 99 and its respectively numbered lead. Flanking the center perimeter contactor pin 97 are the contactor pins 100 and 101, respectively, and connected to their similarly numbered leads. When the ring 31 is operably placed in position over the circuit plate 27, the wiper-slider contacts 49 and 50 are movable with the ring 31 so that in one extreme of movement the slider 50 spans contacts 97 and 101 and the slider 49 spans 95 and 99. In the opposite extreme of travel of the ring, the slider 50 spans contactors 97 and 100, and the slider 49 spans contactors 95 and 98. As will be appreciated, the selector ring 31 in these extremes selects the availability of power to the left mirror 12 or the right mirror 13. The selector ring 31 is moved by the selector lever 21. Throughout this selection, the pendant 20 in the directional section 29 is axially centered by the springs 62 so that the tips 63 are out of contact with power or ground and accordingly the selection movement does not result in power to the mirrors 12 or 13.

However, the movement of the pendant 20 after selection of mirror 12 or 13 allows the selected mirror 12 or 13 to be electrically driven as desired in an up and down fashion by moving the pendant 20 in a vertical plane and by a left or right movement by corresponding shift of the pendant 20 in the horizontal plane. An understanding of this is best achieved by reexamining the FIG. 4 in relation to FIG. 9 and in FIG. 4 the selector section 32 at switch 35 is indicated for the left mirror 12. When the directional control 29 is then activated by, say, moving the R-L pair of wiper tips 63 to contact center post 66 with one element and the octagonal conducting ring 65 with the other, then power flows through the contacts 99 and 95 to the R-L motor M in the left mirror. This is reversible by movement of the mirror direction control 29 or switch 36 in the opposite direction in the same plane so that tips 63 are reversed in position between the contactors, say, 89 and 92 and the grounded octagonal conducting rings 65 and the power post 66. The U-D control operates similarly in the vertical plane from contactors 90 and 91 being closed by their respective tips 63 against first the ground 65 on one side and the power 66 on the other side and reversed in the opposite direction and sending power, properly polarized, to the U-D motor M.

The body 26, the ring 31, the circuit plate 27, the bottom plate 24 and the block 60 are all in a durable plastic material achieving fine detail via injection molding and requiring no finish machining. The lever 21 is made from metal but may be of plastic material. The contactors and fasteners are in brass and are self-fastening in the plastic formed openings, as described. The sliding contactors such as 49 and 50 and the tips 63 are made of good conducting material and capable of extended usage without wear or fatigue under the light persuasion of the springs 57 and 62, respectively. The detent element 76 may be of spring steel since it is not functioning as an electrical conductor.

In the FIG. 4, the motor connectors 102 and 103 for the left hand and right hand mirrors, respectively, couple the three control leads, as shown, with the center lead as a common or ground and the flank leads run one to each of the motors M. Repair and replacement of the mirror units is thus simplified and the connectors 102 and 103 are of the three-prong, three-socket push type.

Functionally, the actuator fixture 17 is a combination of a pair of integrated piggyback switches in coaxial alignment where the selector section 32 is lever actuated to select between two mirrors and the directional control section 29 acts upon the selected mirror 12 or 13 by directing operating current to the mirror connected motors M in each mirror housing 14 and 15. The lever 21 functions in accord with operator logic in a left and right limited movement. The same logic, after selection of mirror, allows the operator to correct the directional position of the selected mirror by an up-down (U-D) control in the vertical plane and by a left-right (L-R) control by left and right movement in a horizontal plane. The unit 17 is compact, durable, easily installed and smooth functioning. In quantity, the units 17 are inexpensive to manufacture and assemble.

The electrical power leads into the actuator are usually integrated in the wiring harness of an automobile so that the turning on of the ignition switch makes current available from the battery and generator of the automobile. However, unless manipulated in accord with the description, the power does not reach the motors because the directional operating pendant is biased to its neutral position on the axis of the actuator. The circuit may be fused in accord with good automotive practice.

Having thus described a preferred and operative embodiment of my invention, those skilled in the art will readily perceive changes, improvements and modifications within the skill of the art and such changes, improvements and modifications are intended to be included in the spirit of the present invention limited only by the scope of my hereinafter appended claims.

I claim:

1. A combination selector and direction control switch in a single elongate body for operating electrically powered left and right rearview remote control mirrors from a single actuator comprising:
a circuit plate in said body having a selectively operated inboard plurality of contacts for polarity reversal in four separate motors together with power leads and an integrated group of six contacts peripherally and concentrically outboard of said polarity reversal contacts and enabling operational selection of mirrors as between said left and right mirrors;
a selector ring having bridging contactors selecting as between said left and right mirrors and in engagement with selected of said concentric outboard contacts;
a pendant element concentric within said selector ring and selectively contacting said inboard contacts and said power leads on said circuit plate to achieve selected reversal of polarity in two planes normal to each other; and
a lever separate from said pendant and concentrically operating said selector ring in one of said two concentric extremes of operating positions.

2. An actuator combination in a single elongate body for electrically operated remote control rearview mirrors for controlling a pair of mirrors, each of said mirrors having two electric motors, said actuator comprising:
a two position selector switch in said body;
a manually controlled directional operating pendant biased to a normally non-conducting position and in a body about which said selector switch is limitedly and concentrically movable;
a lever pivotal from said directional operating switch body and selectively moving said selector switch to one of two extreme concentric positions;
a circuit plate in said body having an inner and outer group of concentric contacts, said inner contacts operably cooperating with said directional operating switch and reversing polarity in two planes of movement of said directional operating switch and said outer group of contacts operably cooperating with said selector switch and said inner group of contacts and operably connected to a left rearview mirror and a right rearview mirror;
a pair of slider contacts in said selector switch routing current to selected of said mirrors in accord with the selected extreme of rotational movement of said selector switch; and
power leads into said circuit plate and activated only upon manipulation of said directional operating switch.

3. An actuator combination as set forth in claim 2 wherein the connection between said inner group of contacts and said outer group of contacts is a pair of radial bridge peices, each having a common connection with one each of said slider contacts.

4. An actuator combination of electrically operated remote control rearview mirrors for controlling a pair of mirrors, each having two electric motors comprising:
an actuator unit;
a directional operating switch lever extending axially from said actuator unit and limitedly movable in a vertical plane and a horizontal plane;
a selector ring on said actuator unit and rotatable thereabout;
a lever on said actuator unit and operably connected to said selector ring and operable to select between two extreme positions;
a circuit plate connected to said actuator unit and having outer selector contacts bridged from selected inner power contacts, said outer contacts selectively activated by said selector ring;
slider contacts in said selector ring selectively engaging said outer selector contacts to direct current to one or the other of said mirrors upon extreme movement of said slider ring; and
contactors carried by said directional operating switch lever to engage and selectively energize said electric motors through said circuit plate by shifting polarity of power in each extreme of position in two planes of movement.

5. An actuator combination for electrically operated remote control rearview mirrors for controlling a pair of mirrors, each having two electric motors;
a body element having a central elongate cavity and an outer concentric surface;
a selector ring journalled on said body for rotation thereabout;
a lever pivotally attached to the outside of said body and operably connected to said ring;
a pendant in said body and having four conductive and spring loaded contacts whereby said spring loaded contacts bias said pendant to a normal position on the axis of said body in a non-conducting position;
movement restricting means in said body and limiting movement of said pendant in a vertical plane and in a horizontal plane, said planes intersecting on the axis of said body;
a circuit plate beneath said selector ring and having four contactors clustered about a center contactor post and within an octagonal conducting ring and said plate including six perimeter contactors in two groups of three in each group receiving power from selected of said clustered contactors, said clustered contactors in normal touch with said spring loaded contacts when said pendant is axially oriented and one pair of said spring loaded contacts movable with said pendant in an up and down movement and the other pair of said spring loaded contacts movable with said pendant in a left-right movement, both extremes of movements of said spring loaded contacts closing opposite of said spring loaded contacts between center post and respective contactor and between conducting ring and respective spring loaded contact and circuitry leading power to said perimeter contactors upon movement of said spring loaded contacts; and
a pair of sliders in said selector ring making selected bridging contact between a common center contact and on each of flanking contacts in each said group of three contactors whereby directed power is routed to one and then the other of said mirrors.

* * * * *